R. W. TAYLOR.
BATTERY CONTAINER.
APPLICATION FILED OCT. 25, 1920.

1,425,721.

Patented Aug. 15, 1922.

INVENTOR
R. W. Taylor
BY Munn & Co.
ATTORNEYS

UNITED STATES PATENT OFFICE.

ROY WILLIAM TAYLOR, OF CHICAGO, ILLINOIS.

BATTERY CONTAINER.

1,425,721.  Specification of Letters Patent.  Patented Aug. 15, 1922.

Application filed October 25, 1920. Serial No. 419,365.

*To all whom it may concern:*

Be it known that I, ROY WILLIAM TAYLOR, a citizen of the United States, and a resident of Chicago, in the county of Cook and State of Illinois, have invented a new and useful Improvement in Battery Containers, of which the following is a full, clear, and exact description.

My invention relates to improvements in battery containers, and it consists in the combinations, constructions, and arrangements herein described and claimed.

An object of my invention is to provide a battery container adapted to house a plurality of dry cells and having means for connecting up such cells in either series or multiple in such a manner that any cell therein may be replaced at will.

A further object of my invention is to provide a device of the type described that can be used in the manner set forth to provide a battery composed of ordinary flashlight cells that is suitable for use in wireless telegraph outfits and in apparatus used in electrotherapeutics.

A further object of my invention is to provide a device of the type described that is light in weight, compact, and adapted to be carried about as in a small handbag, or the like.

A further object of my invention is to provide a device of the type described that is relatively simple in construction and operation, not likely to get out of order easily, and thoroughly practical commercially.

Other objects and advantages will appear in the following specification, and the novel features of the device will be particularly pointed out in the appended claims.

My invention is illustrated in the accompanying drawings forming part of this application, in which—

Figure 2:
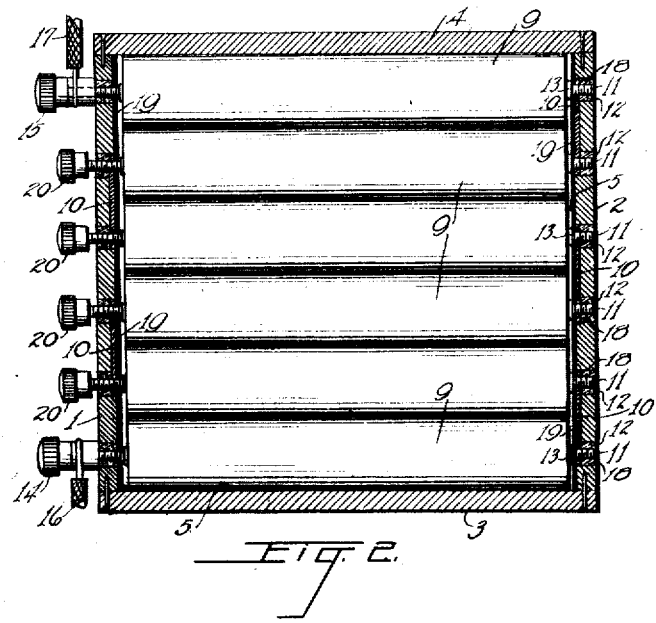
Figure 2 is a section along the line 2—2 of Figure 1.
Figure 1:
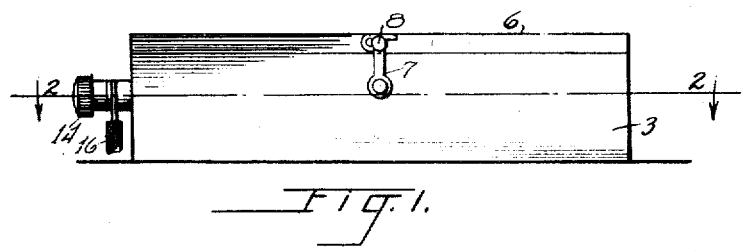
Figure 1 is an end view of the device.

I am aware that batteries composed of flashlight cells have been provided prior to my invention, but such batteries, so far as I am aware, have been formed of cells so connected and so encased as to necessitate the discarding of the entire battery as soon as one of the cells therein became unserviceable. Furthermore, in the batteries of the type described of which I am aware, rearrangement of the individual cells could not be accomplished after the battery was completed.

In carrying out my invention, I provide a casing having side walls 1 and 2, end walls 3 and 4, a bottom 5, and a cover 6 secured to the end wall 4 in any suitable manner as by means of hinges (not shown). The cover may be maintained in closed position by ordinary means, such as a hook 7 secured to the end 3 for engaging with a stud 8 carried by the cover 6.

The casing may be of any desired size to render the same suitable for enclosing any predetermined number of dry cells 9 of a certain size. Six of the cells 9 are enclosed within the casing illustrated in the drawings. Obviously, each of the cells 9 may be made up of a plurality of sections, as is a common practice in providing flashlight cells of different lengths.

The side walls 1 and 2 are parallel and are each formed with a plurality of openings 18 extending therethrough, each opening being adapted to receive a bushing 12 that is formed of a suitable insulating material, such as mica, or the like. It will be observed that the number of openings through each of the side walls 1 and 2 is determined by the number of cells which the casing is adapted to house and that the bushings in the side wall 1 oppose corresponding bushings in the side wall 2. Screws 11 having their inner ends upset at 13 have a threaded engagement with the bushings 12, the inner upset ends thereof being adapted to contact with the adjacent electrodes of the cells 9. Connectors 10 are disposed between certain of the screws 11 carried by each of the sides 1 and 2, these connectors being arranged in staggered relation. That is to say, that the connectors carried by the screws in the side 1 are opposite the spaces between the ends of the connectors carried by the screws in the side 2. The walls 1 and 2 are lined at 19 with a suitable insulating material.

From the foregoing description of the various parts of the device, the operation thereof may be readily understood. The cells 9 may be arranged within the casing in either series or multiple, as desired. Certain of the screws 11 are extended exterior of the casing and are provided with caps 20, wherefore the screws 11 may be adjusted relative the cells 9 to clamp the latter in the position shown. The caps 20 are formed of any suitable insulating material. The screws 11 positioned to contact with the remote electrodes of the remote cells in the casing are extended and provided with binding posts 14 and 15 to which electrical conducting wires 16 and 17, respectively, are connected.

A battery formed of the dry cells 9 in the manner described, is suitable for use in operating a door bell, in electrotherapeutics, in wireless telegraph systems, and for various other uses. When one of the cells in the battery becomes impaired, the same may be replaced by a new cell. Consequently, the ordinary flashlight cells may be utilized to advantage in various ways at a relatively low cost when my improved battery container is employed.

I claim:

1. A battery container comprising a casing, a plurality of batteries disposed in said casing, fixed contact screws disposed along one side of said casing and engaging the ends of said batteries adjacent thereto, a plurality of manually adjustable contact screws disposed along the other side of said casing and being adapted to engage the other ends of said batteries whereby said batteries are positively secured in place, terminals carried by said container, and electrical conducting plates carried by said first and second named contact screws for connecting said batteries in series with said terminals.

2. A battery container comprising a casing, a plurality of batteries disposed in said casing, fixed contact screws disposed along one side of said casing and engaging the ends of said batteries adjacent thereto, means for insulating said screws from said container, a plurality of adjustable contact screws disposed along the other side of said casing and being adapted to engage the other ends of said batteries, said last named screws adapted to be manually operated from the outside of said container, whereby said batteries can be positively gripped between said first and second named screws, means for insulating said second named screws from said container, terminals carried by said container, and electrical conducting plates carried by said first and said second named contact screws for connecting said batteries in series with said terminals.

3. A battery container adapted to contain a plurality of dry cells, said container comprising a casing, fixed contact screws disposed along one side of said casing and adapted to engage the ends of said dry cells adjacent thereto, a plurality of manually adjustable contact screws disposed along the opposite side of said casing and being adapted to engage the opposite end of said dry cells, said last named screws being arranged for adjustment from the outside of said casing, contact plates carried by said first and second named screws for connecting said dry cells in series, and terminals leading from the remote cells of said series.

ROY WILLIAM TAYLOR.